(12) United States Patent
Jiang

(10) Patent No.: US 8,300,157 B2
(45) Date of Patent: Oct. 30, 2012

(54) METHOD FOR ESTIMATING FREQUENCY OFFSETS AND FREQUENCY OFFSET ESTIMATION CIRCUIT THEREOF

(75) Inventor: Jeng-Shiann Jiang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 1241 days.

(21) Appl. No.: 11/936,044

(22) Filed: Nov. 6, 2007

(65) Prior Publication Data

US 2009/0115914 A1 May 7, 2009

(51) Int. Cl.
*H04N 5/50* (2006.01)
(52) U.S. Cl. ........................................ 348/735
(58) Field of Classification Search .................... 348/735
See application file for complete search history.

(56) References Cited

U.S. PATENT DOCUMENTS

| | | | | |
|---|---|---|---|---|
| 4,516,170 A | * | 5/1985 | Skerlos | 348/731 |
| 4,901,368 A | * | 2/1990 | Arnold et al. | 455/12.1 |
| 5,675,277 A | * | 10/1997 | Cooper et al. | 327/238 |
| 6,396,550 B1 | * | 5/2002 | Oh | 348/735 |
| 6,810,090 B1 | | 10/2004 | Perlow | |
| 7,742,388 B2 | * | 6/2010 | Shearer et al. | 370/204 |
| 2004/0161056 A1 | | 8/2004 | Jun | |
| 2004/0261122 A1 | | 12/2004 | Kim | |
| 2005/0196072 A1 | * | 9/2005 | Zhong | 382/298 |
| 2007/0030927 A1 | * | 2/2007 | Jard et al. | 375/340 |
| 2007/0172003 A1 | | 7/2007 | Kim | |
| 2009/0295995 A1 | * | 12/2009 | Aggarwal et al. | 348/553 |
| 2010/0177857 A1 | * | 7/2010 | Huttunen et al. | 375/350 |

FOREIGN PATENT DOCUMENTS

CN 1285995 A 2/2001

* cited by examiner

*Primary Examiner* — Pankaj Kumar
*Assistant Examiner* — Franklin Andramuno
(74) *Attorney, Agent, or Firm* — Winston Hsu; Scott Margo (57) ABSTRACT

A method for estimating frequency offsets is disclosed. The method includes shifting a target signal from a first specific frequency band to a second specific frequency band to generate a pre-offset signal according to a frequency shifting direction, performing a specific filtering operation upon the pre-offset signal to generate a filtered pre-offset signal, shifting the filtered pre-offset signal from the second specific frequency band to a base band to generate a base-band (BB) signal according to the frequency shifting direction, and performing a frequency offset estimation upon the base-band signal. The target signal complies with a specific TV format. The specific TV format is an advanced television system committee (ASTC) format or a digital multimedia broadcast-terrestrial/handheld (DMB-T/H) format.

18 Claims, 8 Drawing Sheets

METHOD FOR ESTIMATING FREQUENCY OFFSETS AND FREQUENCY OFFSET ESTIMATION CIRCUIT THEREOF

BACKGROUND OF THE INVENTION

1. Field of the Invention

The present invention relates to estimating frequency offsets, and more particularly, to a method for estimating frequency offsets and related frequency offset estimation circuit through shifting a target signal from a first specific frequency band to a second specific frequency band according to a frequency shifting direction before performing a specific filtering operation and then shifting the resultant filtered signal it to a base band.

2. Description of the Prior Art

With the coming of the digital era, television broadcasting has gradually transformed from conventional analog systems into digital systems. Digital video broadcasting systems are able to overcome poor receiving quality or weak signals resulted from terrain factors by existing analog video broadcasting systems and to provide TV programs with higher quality. Present digital television broadcasting formats include the Advanced Television Systems Committee (ATSC) format in the United States, the Digital Video Broadcasting-Terrestrial (DVB-T) format in Europe, and the Integrated Services Digital Broadcasting-Terrestrial (ISDB-T) format in Japan.

Figure 1:
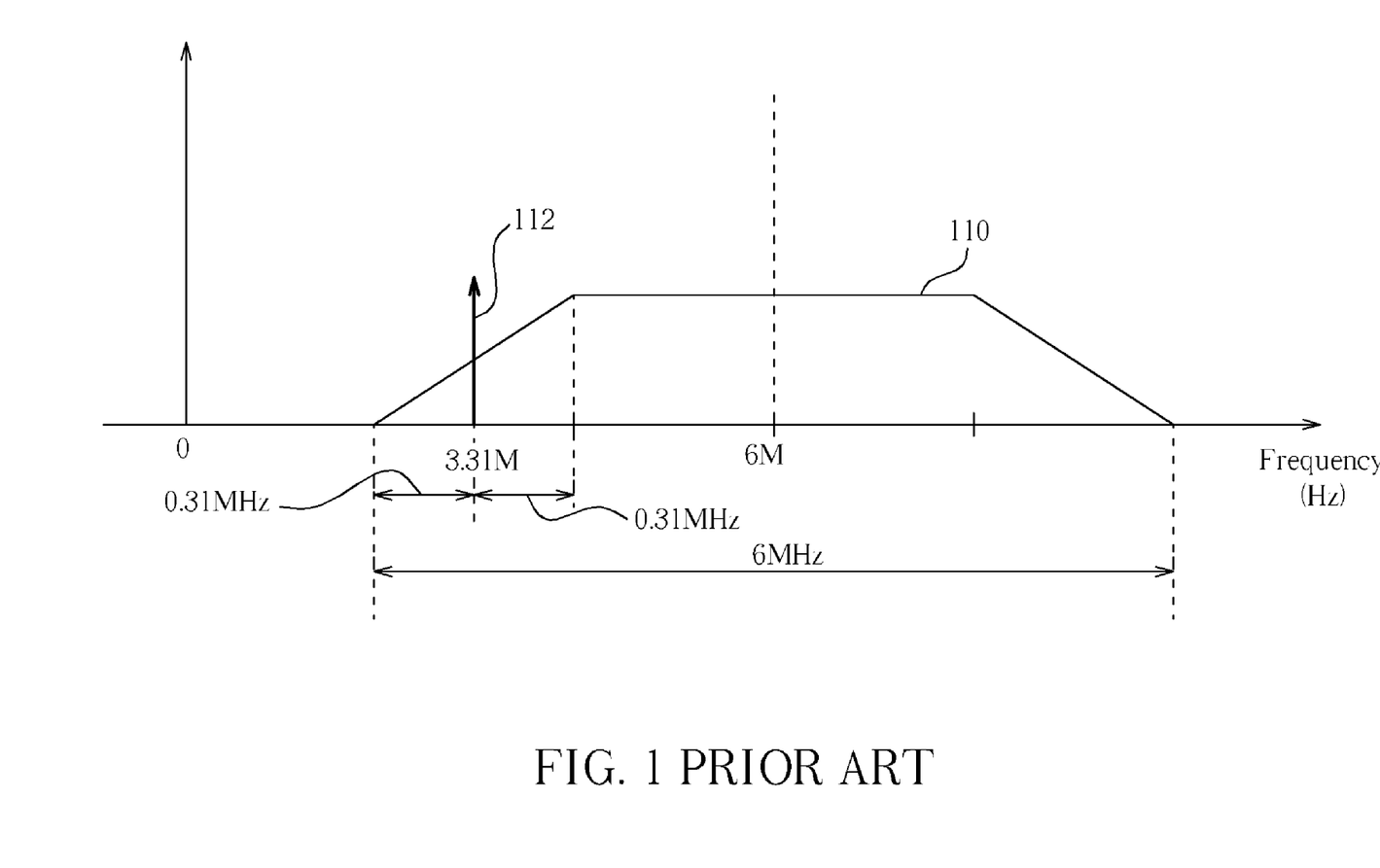
FIG. 1 is a frequency spectrum diagram for an ATSC format television signal according to the prior art.

Please refer to FIG. 1. FIG. 1 is a frequency spectrum diagram for an ATSC format television signal 110 according to the prior art. In the ATSC standard, a frequency band of 6 MHz is utilized for one channel, which is the same as the frequency band of the NTSC standard. As shown in FIG. 1, the ATSC format television signal 110 is in an intermediate frequency (IF) band, which has a center frequency at 6 MHz and has a frequency band of 6 MHz. The ATSC format television signal 110 further includes a pilot signal 112 located at 3.31 MHz. The ATSC format television signal 110 has a signal characteristic that the intensity of signals at higher frequencies than the pilot signal 112 is much greater than the intensity of signals at lower frequencies than the pilot signal 112, thus interference induced from signals at higher frequencies is much greater than interference caused from signals at lower frequencies.

Figure 2:
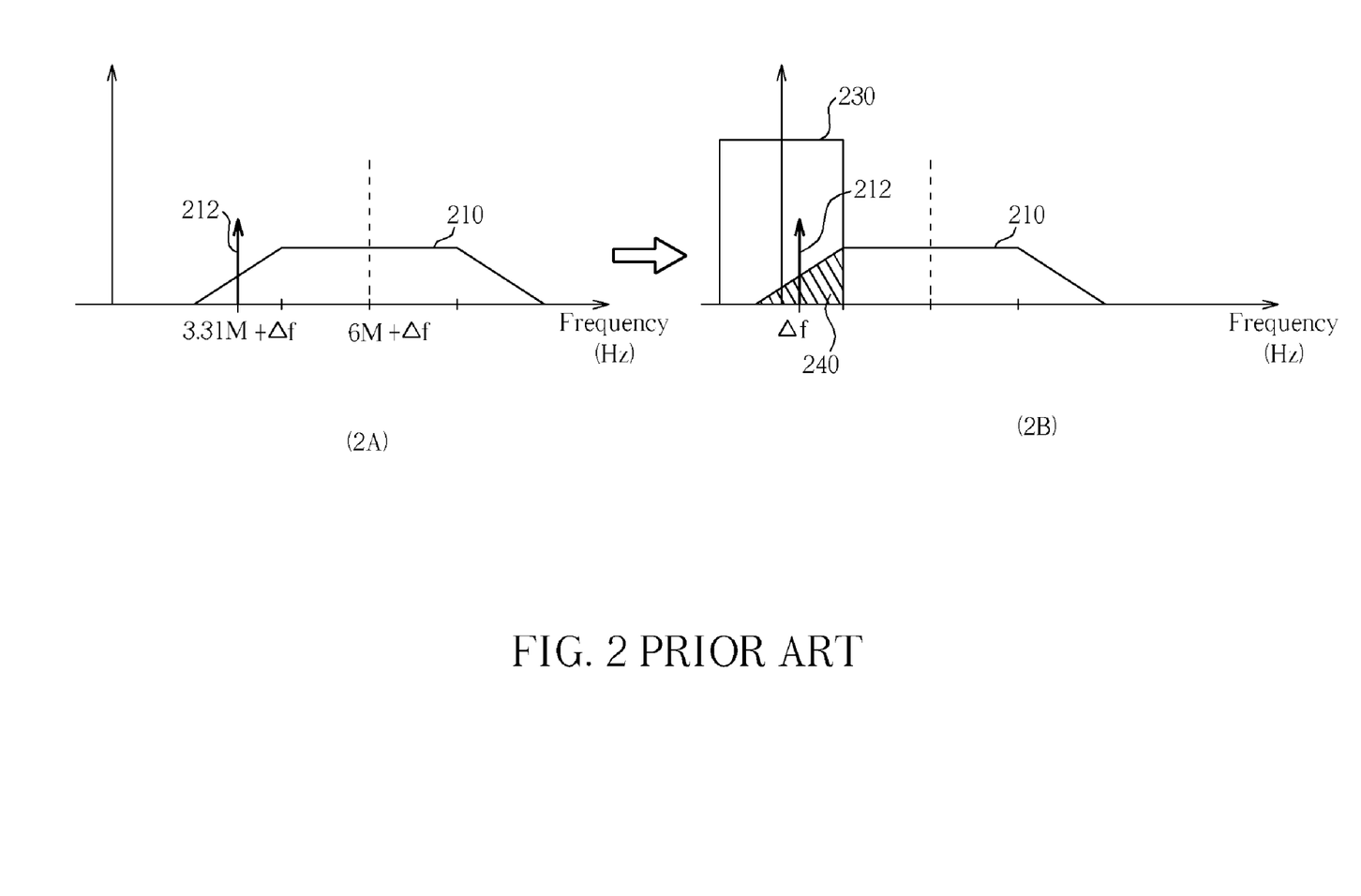
FIG. 2A and FIG. 2B are frequency spectrum diagrams for transforming a first ATSC format television signal from an IF band to a base band according to the prior art.

Please refer to FIG. 2. FIG. 2A and FIG. 2B are frequency spectrum diagrams for transforming a first ATSC format television signal 210 from an IF band to a base band according to the prior art. In FIG. 2A, the first ATSC format television signal 210 is in the IF band and has a first frequency offset $\Delta f$, which is a positive value in a frequency axis (i.e., $\Delta f > 0$), therefore, its center frequency is at $(6+\Delta f)$ MHz. The first ATSC format television signal 210 also has a pilot signal 212 located at $(3.31+\Delta f)$ MHz. The first ATSC format television signal 210 is then shifted from the IF band to the base band, as shown in FIG. 2B. In FIG. 2B, the first ATSC format television signal 210 is in the base band and the pilot signal 212 is at $\Delta f$ MHz due to the positive frequency offset $\Delta f$. After frequency shifting, the first ATSC format television signal 210 is filtered by a filter 230. A slanted area 240 shown in FIG. 2B indicates the signals that interfere with the pilot signal 212 after filtering.

Figure 3:
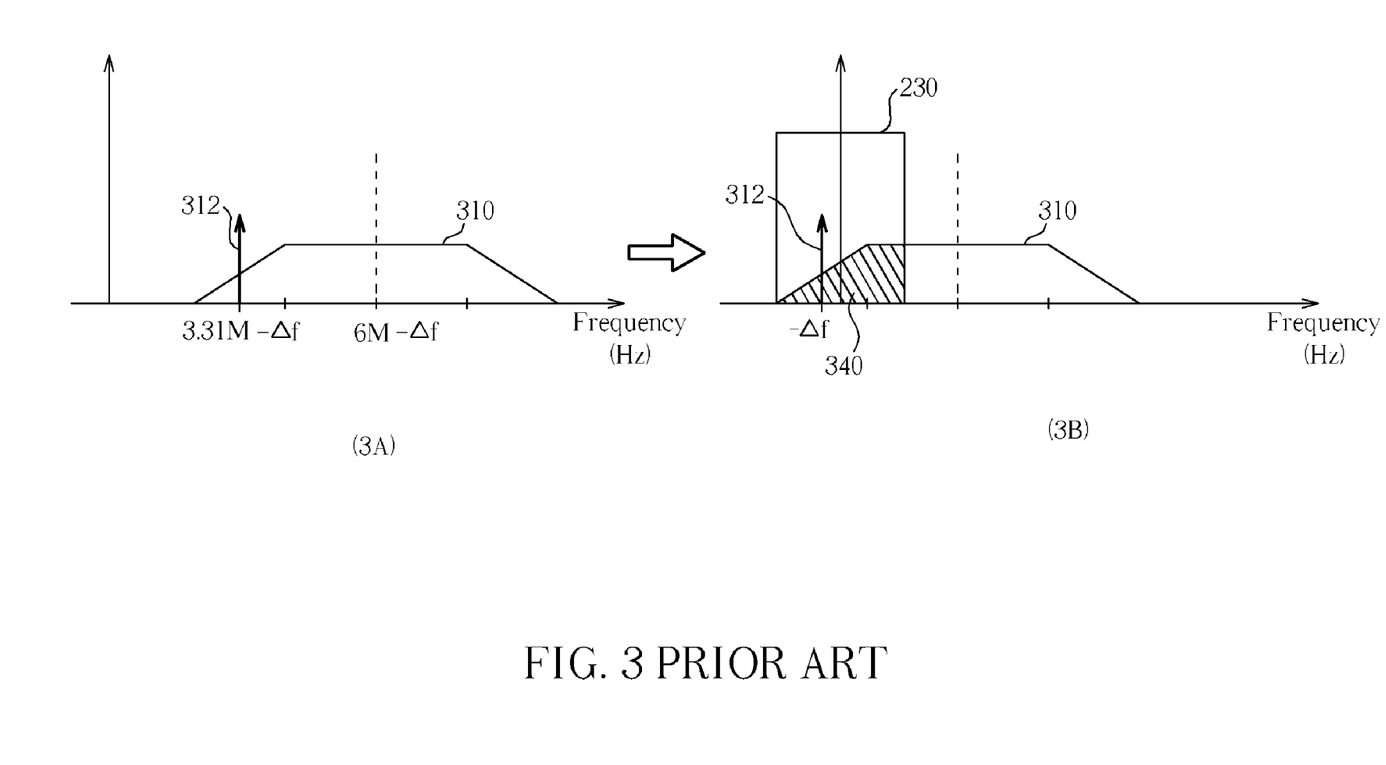
FIG. 3A and FIG. 3B are frequency spectrum diagrams for transforming a second ATSC format television signal from an IF band to a base band according to the prior art.

Please refer to FIG. 3. FIG. 3A and FIG. 3B are frequency spectrum diagrams for transforming a second ATSC format television signal 310 from an IF band to a base band according to the prior art. In FIG. 3A, the second ATSC format television signal 310 is in the IF band and has a second frequency offset $(-\Delta f)$, which is a negative value in the frequency axis (i.e., $(-\Delta f)<0$), therefore, its center frequency is at $(6-\Delta f)$ MHz. The second ATSC format television signal 310 also has a pilot signal 312 located at $(3.31-\Delta f)$ MHz. The second ATSC format television signal 310 is then shifted from the IF band to the base band. In FIG. 3B, the second ATSC format television signal 310 is in the base band and the pilot signal 312 is at $-(\Delta f)$ MHz due to the negative frequency offset $(-\Delta f)$. After frequency shifting, the second ATSC format television signal 310 is filtered by the same filter 230. A slanted area 340 shown in FIG. 3B indicates the signals that interfere with the pilot signal 312 after filtering.

Please compare FIG. 2 with FIG. 3. As one can see, the slanted area 240 shown in FIG. 2B is much smaller than the slanted area 340 shown in FIG. 3B. Therefore, a demodulator for the ATSC format television signals has a tolerance of the positive frequency offset higher than a tolerance of the negative frequency offset. If the negative frequency offset is greater than a specific value (such as 100 KHz), this will easily result in wrong frequency offset estimation and cause synchronization failure. Therefore, there still needs efforts for improving the negative frequency offset estimation.

SUMMARY OF THE INVENTION

It is one of the objectives of the claimed invention to provide a method for estimating frequency offsets and related frequency offset estimation circuit to solve the abovementioned problems.

The present invention discloses a method for estimating frequency offsets. The method includes shifting a target signal from a first specific frequency band to a second specific frequency band to generate a pre-offset signal according to a frequency shifting direction, performing a specific filtering operation upon the pre-offset signal to generate a filtered pre-offset signal, shifting the filtered pre-offset signal from the second specific frequency band to a base band to generate a base-band (BB) signal according to the frequency shifting direction, and performing a frequency offset estimation upon the base-band signal. The target signal complies with a specific TV format. The frequency shifting direction is a direction shifting signals from a higher frequency to a lower frequency in the frequency axis. Thus, a center frequency of the first specific frequency band is greater than that of the second specific frequency band, and the center frequency of the second specific frequency band is greater than that of the base band.

In one embodiment, the target signal complies with an advanced television system committee (ASTC) format.

In one embodiment, the target signal complies with a digital multimedia broadcast-terrestrial/handheld (DMB-T/H) format.

The present invention discloses a method for estimating frequency offsets. The method includes shifting an intermediate frequency (IF) signal from an IF band to a specific frequency band to generate a pre-offset signal according to a frequency shifting direction, performing a specific filtering operation upon the pre-offset signal to generate a filtered pre-offset signal, shifting the filtered pre-offset signal from the specific frequency band to a base band to generate a base-band (BB) signal according to the frequency shifting direction, and performing a frequency offset estimation upon the base-band signal. The frequency shifting direction is a direction shifting signals from a higher frequency to a lower frequency in the frequency axis. Thus a center frequency of the IF band is greater than that of the specific frequency band, and the center frequency of the specific frequency band is greater than that of the base band.

The present invention discloses a frequency offset estimation circuit. The frequency offset estimation circuit includes a frequency shifter, a filter, and a frequency offset estimation module. The frequency shifter is used for shifting a target signal from a first specific frequency band to a second specific frequency band to generate a pre-offset signal according to a frequency shifting direction and for shifting a filtered pre-offset signal from the second specific frequency band to a base band to generate a base-band (BB) signal according to the frequency shifting direction. The target signal complies with a specific TV format. The filter is coupled to the frequency shifter for performing a specific filtering operation upon the pre-offset signal to generate the filtered pre-offset signal. The frequency offset estimation module is coupled to the filter for performing a frequency offset estimation upon the base-band signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 4:
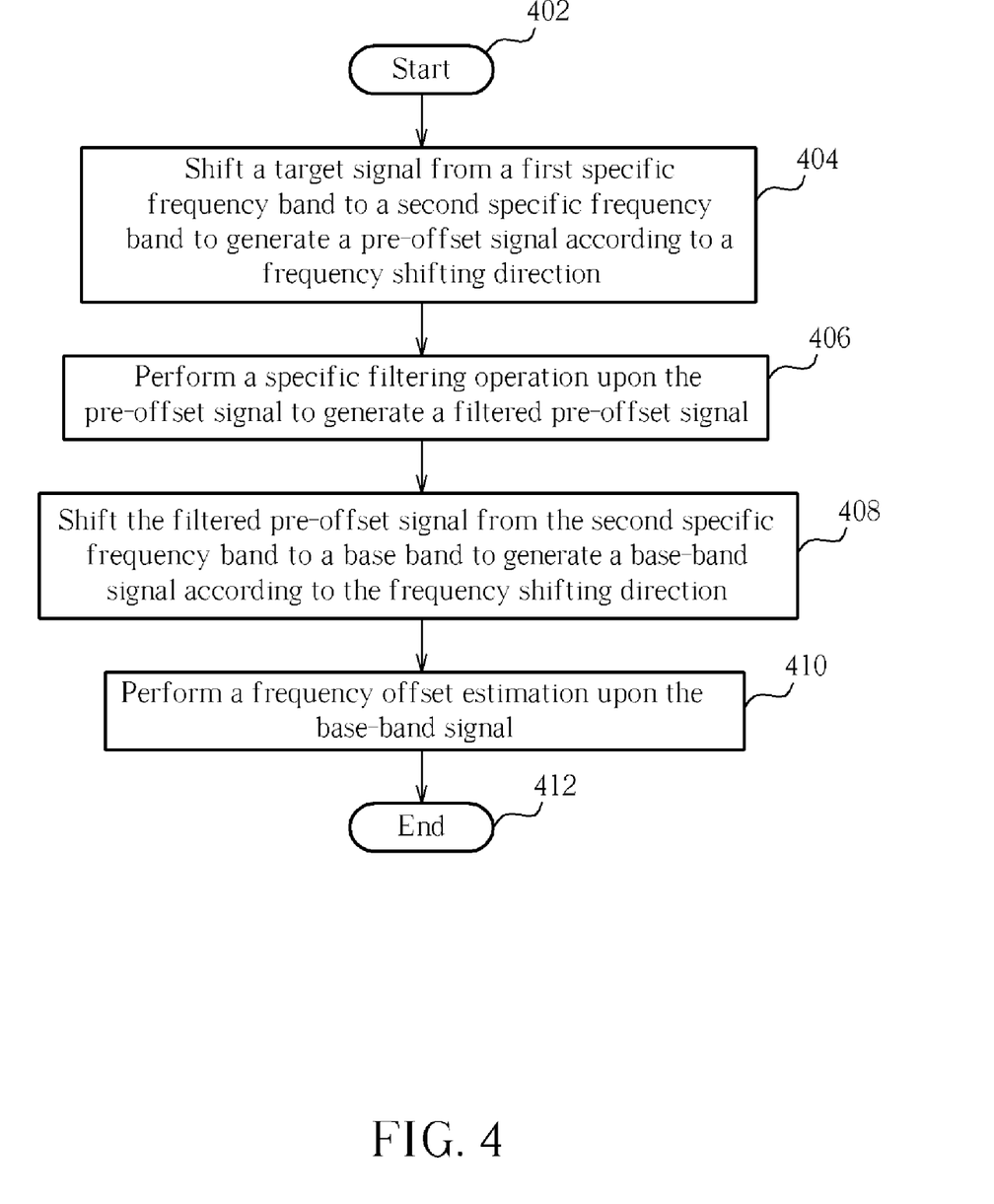
FIG. 4 is a flowchart illustrating a method for estimating frequency offsets according to an embodiment of the present invention.

Please refer to FIG. 4. FIG. 4 is a flowchart illustrating a method for estimating frequency offsets according to an embodiment of the present invention. The exemplary method of the present invention includes, but is not limited to, the following steps:

Step 402: Start.

Step 404: Shift a target signal from a first specific frequency band to a second specific frequency band to generate a pre-offset signal according to a frequency shifting direction, wherein the target signal complies with a specific TV format.

Step 406: Perform a specific filtering operation upon the pre-offset signal to generate a filtered pre-offset signal.

Step 408: Shift the filtered pre-offset signal from the second specific frequency band to a base band to generate a base-band (BB) signal according to the frequency shifting direction.

Step 410: Perform a frequency offset estimation upon the base-band signal.

Step 412: End.

Figure 5:
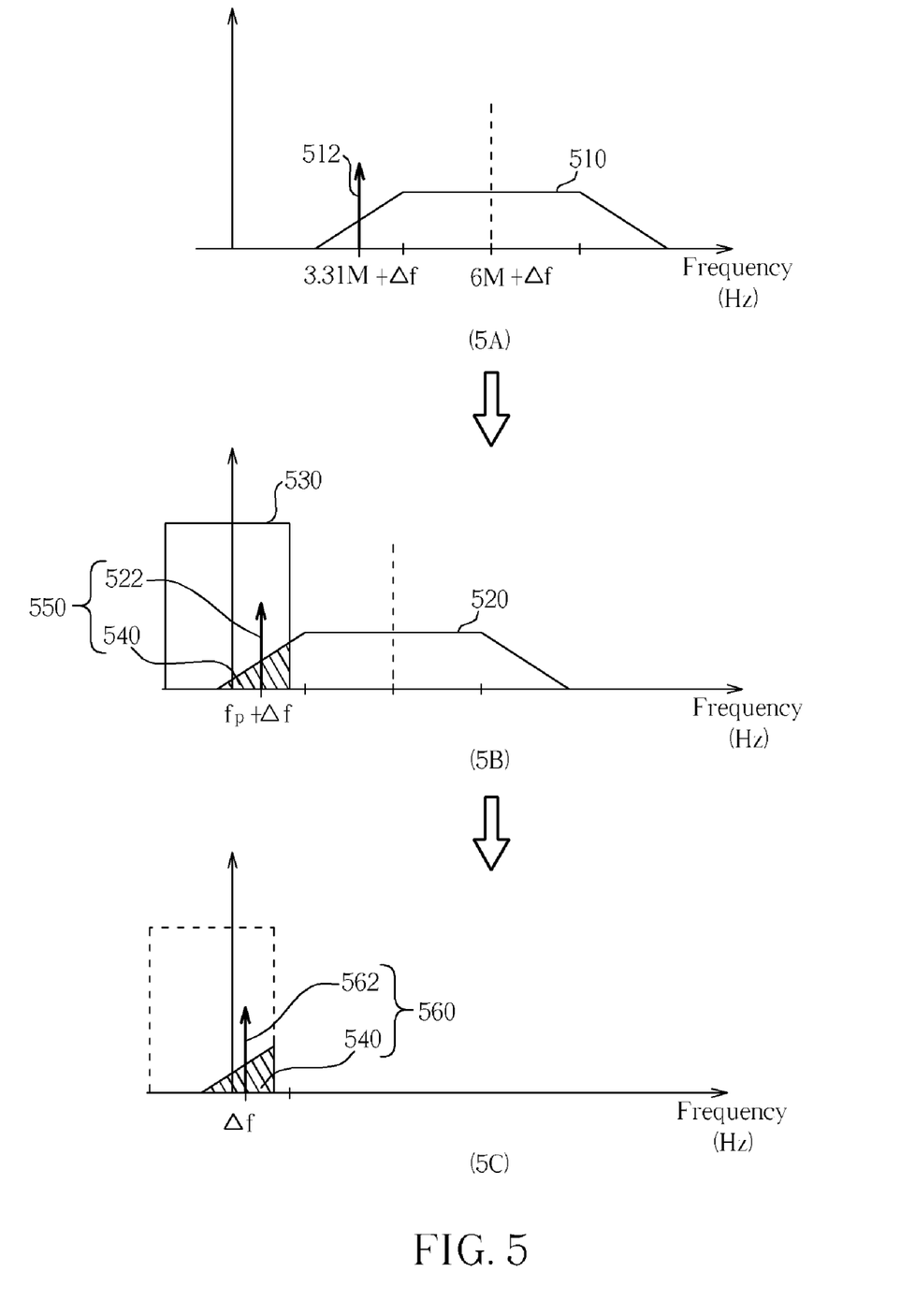
FIG. 5A, FIG. 5B, and FIG. 5C are frequency spectrum diagrams for transforming a first a target signal from an IF band to a base band according to an embodiment of the present invention.

Please refer to FIG. 5. FIG. 5A, FIG. 5B, and FIG. 5C are frequency spectrum diagrams for transforming a first target signal 510 from an IF band to a base band according to an embodiment of the present invention. In this embodiment, the first target signal 510 complies with an advanced television system committee (ASTC) format. In FIG. 5A, the first target signal 510 is in the IF band and has a first frequency offset $\Delta f$, which is a positive value in a frequency axis (i.e., $\Delta f > 0$), therefore, its center frequency is at $(6+\Delta f)$ MHz. The first target signal 510 has a pilot signal 512 located at $(3.31+\Delta f)$ MHz. The first target signal 510 is then shifted from a first specific frequency band (i.e., the IF band) to a second specific frequency band to generate a first pre-offset signal 520. In FIG. 5B, a pilot signal 522 of the first pre-offset signal 520 is at $(fp+\Delta f)$ MHz, wherein fp indicates a pre-offset frequency and is a positive value. After the first time frequency shift, the first pre-offset signal 520 is filtered by a filter 530 to generate a first filtered pre-offset signal 550. A slanted area 540 shown in FIG. 5B indicates the signals that interfere with the pilot signal 522 after filtering. Finally, the first filtered pre-offset signal 550 is further shifted from the second specific frequency band to the base band to generate a base-band (BB) signal 560. It should be noted that the frequency shifting direction in this embodiment is from high frequency to low frequency in the frequency axis. In FIG. 5C, a pilot signal 562 of the BB signal 560 is at $\Delta f$ MHz. In other words, the first target signal 510 is first shifted from the IF band to the second specific frequency band (i.e., the pilot signal is shifted from $(3.31+\Delta f)$ MHz to $(fp+\Delta f)$ MHz), filtered by the filter 530, and eventually shifted from the second specific frequency band to the desired base band (i.e., the pilot signal is shifted from $(fp+\Delta f)$ MHz to $\Delta f$ MHz).

Figure 6:
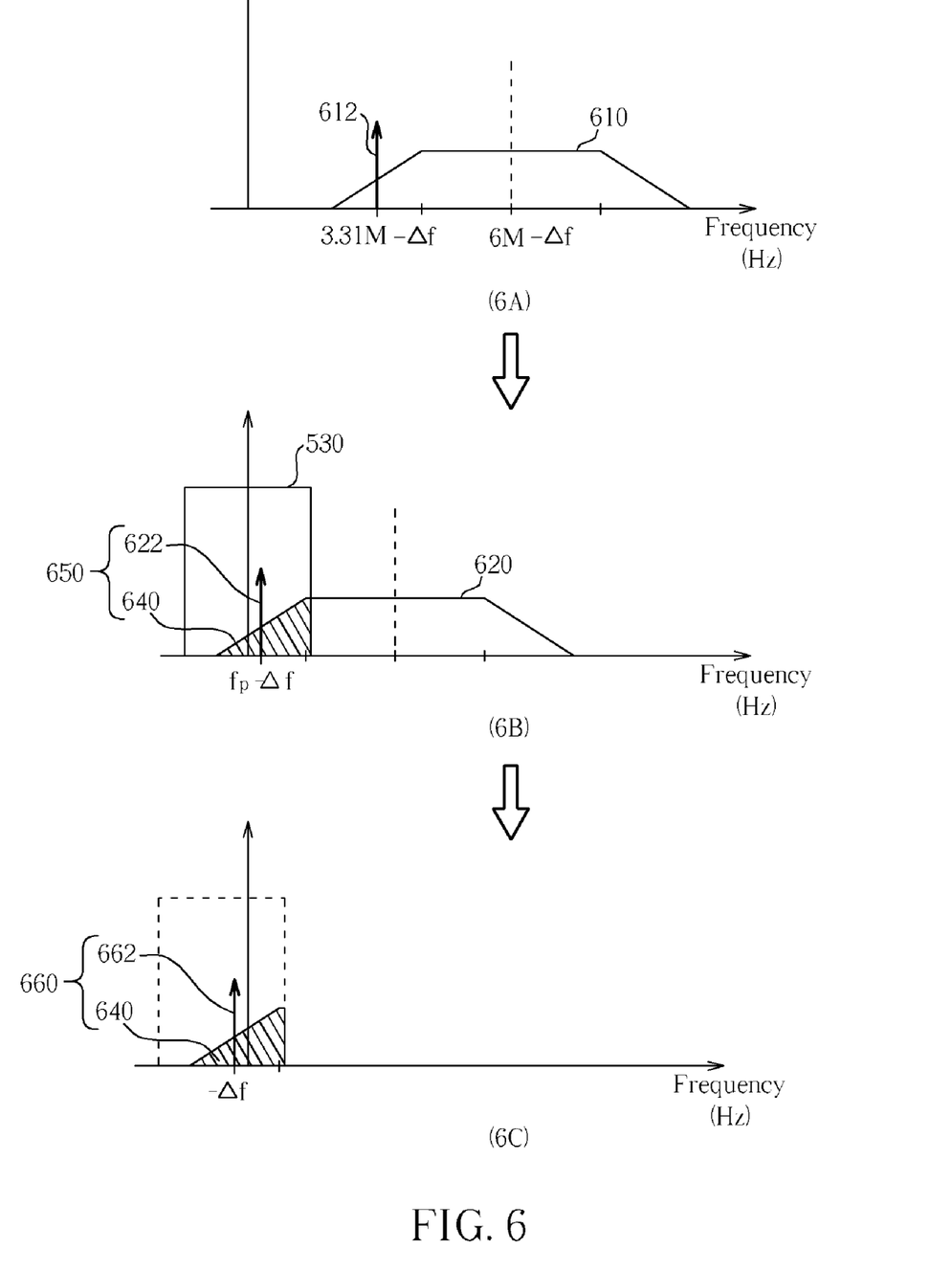
FIG. 6A, FIG. 6B, and FIG. 6C are frequency spectrum diagrams for transforming a second a target signal from an IF band to a base band according to another embodiment of the present invention.

Please refer to FIG. 6. FIG. 6A, FIG. 6B, and FIG. 6C are frequency spectrum diagrams for transforming a second target signal 610 from an IF band to a base band according to another embodiment of the present invention. In this embodiment, the second target signal 610 complies with an advanced television system committee (ASTC) format. In FIG. 6A, the first target signal 610 is in the IF band and has a second frequency offset $(-\Delta f)$, which is a negative value in the frequency axis (i.e., $(-\Delta f) < 0$), therefore, its center frequency is at $(6-\Delta f)$ MHz. The second target signal 610 has a pilot signal 612 located at $(3.31-\Delta f)$ MHz. The second target signal 610 is then shifted from a first specific frequency band (i.e., the IF band) to a second specific frequency band to generate a second pre-offset signal 620. In FIG. 6B, a pilot signal 622 of the second pre-offset signal 620 is at $(fp-\Delta f)$ MHz, wherein fp indicates a pre-offset frequency and is a positive value. After the first time frequency shift, the second pre-offset signal 620 is filtered by the same filter 530 to generate a second filtered pre-offset signal 650. A slanted area 640 shown in FIG. 6B indicates the signals that interfere with the pilot signal 622 after filtering. Finally, the second filtered pre-offset signal 650 is shifted from the second specific frequency band to the base band to generate a base-band (BB) signal 660. It should be noted that the frequency shifting direction in this embodiment is from high frequency to low frequency in the frequency axis. In FIG. 6C, a pilot signal 662 of the BB signal 660 is at (−Δf) MHz. In other words, the second target signal 610 is first shifted from the IF band to the second specific frequency band (i.e., the pilot signal is shifted from (3.31−Δf) MHz to (fp−Δf) MHz), filtered by the filter 530, and eventually shifted from the second specific frequency band to the base band (i.e., the pilot signal is shifted from (fp−Δf) MHz to (−Δf) MHz).

Please note that, the negative frequency representation in Fourier analysis is only for mathematical senses it included and has no physical meaning at all. Actually, the concept of negative and positive frequencies can be as simple as a wheel rotating one way or the other way. A "signed value" of frequencies indicates both the rate and the direction of rotation. By convention, a positive frequency is associated with rotation in the counterclockwise direction whereas a negative frequency represents rotation in the clockwise direction.

In the following description, the steps shown in FIG. 4 are collocated with the figures shown in FIG. 5 and FIG. 6 for further detailed descriptions of operating manners.

In step 404, a target signal is shifted from a first specific frequency band to a second specific frequency band to generate a pre-offset signal according to a frequency shifting direction, for example, for high frequency to low frequency in the frequency axis. If the target signal has a positive frequency offset (such as the first frequency offset Δf), refer to FIG. 5A and FIG. 5B; if the target signal has a negative frequency offset (such as the second frequency offset (−Δf)), refer to FIG. 6A and FIG. 6B. In step 406, a specific filtering operation is performed upon the pre-offset signal to generate a filtered pre-offset signal (such as the filter 530 shown in FIG. 5B and FIG. 6B). And then the filtered pre-offset signal is shifted from the second specific frequency band to the base band to generate a base-band (BB) signal according to the frequency shifting direction (step 408), which can be seen in FIG. 5C and FIG. 6C. In step 410, a frequency offset estimation is performed upon the base-band signal finally, which will have detail description in the following embodiments.

Please keep referring to FIG. 5 and FIG. 6 together with FIG. 2 and FIG. 3. In FIG. 2 and FIG. 3, the slanted area 240 shown in FIG. 2B is much smaller than the slanted area 340 shown in FIG. 3B. This is because the second frequency offset (−Δf) makes the pilot 312 fall in a negative value in the frequency axis. Therefore, the filtered signal will be interfered by the signals having higher frequencies than the pilot seriously. On the other hand, the size of the slanted area 540 shown in FIG. 5B approximates to the size of the slanted area 640 shown in FIG. 6B. This is because the pre-offset frequency fp makes the pilot 622 fall in a positive value (or a very small negative value) on the frequency axis. Therefore, the filtered pre-offset signal 650 won't be interfered by the signals having higher frequencies than the pilot signal seriously.

Please note that the first target signal 510 and the second target signal 610 in above exemplary embodiment both comply with an ASTC format, but this should not be a limitation of the present invention, they can also comply with a digital multimedia broadcast-terrestrial/handheld (DMB-T/H) format or other digital broadcasting formats.

In one embodiment, the pre-offset frequency fp is substantially equal to 300 KHz, which is an optimum value for the ASTC format. In this case, if the pilot signal of the target signal is shifted from the IF band to the pre-offset frequency fp (300 KHz) before shifting it to the base band, the range of the frequency offset estimation (−Δf/Δf) can extend from −400 kHz to 400 KHz. If the pilot signal of the target signal is directly shifted from the IF band to the base band, the range of the frequency offset estimation is only from −100 KHz to 700 KHz. Therefore, the negative frequency offset estimation is improved through the present invention. However, the pre-offset frequency fp is not limited to set to 300 KHz exactly, and can be adjusted depending on demands of circuit designers.

Furthermore, the filter 530 shown in FIG. 5 and FIG. 6 should be the same as the filter 230 shown in FIG. 2 and FIG. 3. Both the filters 530 and 230 have a cut-off frequency and are used for filtering out signal components having frequencies greater than the cut-off frequency. The filters 530 and 230 can be a low-pass filter (LPF) or band-pass filter (BPF) or a combination thereof, but is not limited to this only and can be filters of other types, if the same objective of filtering out unwanted signal components is achieved.

Figure 7:
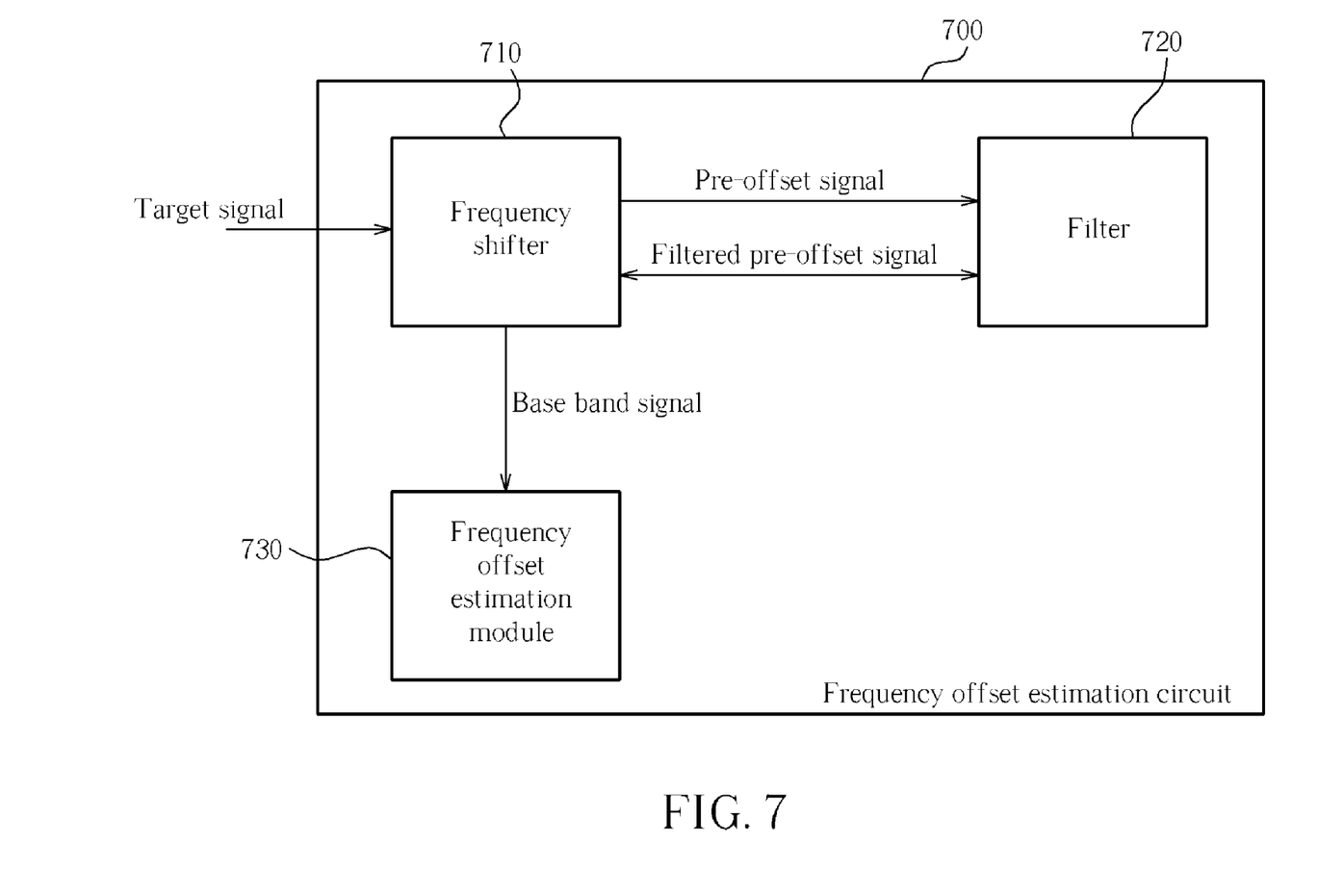
FIG. 7 is a block diagram of a frequency offset estimation circuit according to an embodiment of the present invention.

Please refer to FIG. 7. FIG. 7 is a block diagram of a frequency offset estimation circuit 700 according to an embodiment of the present invention. The frequency offset estimation circuit 700 includes, but is not limited to, a frequency shifter 710, a filter 720, and a frequency offset estimation module 730. The filter 720 is coupled to the frequency shifter 710. The frequency offset estimation module 730 is coupled to the frequency shifter 710.

In the following description, how each element operates is described by collocating the steps shown in FIG. 4 and the elements shown in FIG. 7. At first, a target signal is shifted from a first specific frequency band to a second specific frequency band to generate a pre-offset signal according to a frequency shifting direction by the frequency shifter 710 (step 404). And then a specific filtering operation is performed upon the pre-offset signal to generate a filtered pre-offset signal by the filter 720 (step 406). The filtered pre-offset signal is shifted from the second specific frequency band to a base band to generate a base-band (BB) signal according to the frequency shifting direction by the frequency shifter 710 (step 408). Finally, a frequency offset estimation is performed upon the base-band signal by the frequency offset estimation module 730 (step 410).

Please note that the above-mentioned frequency shifter 710 can includes two frequency shifting units, where one is used for shifting the target signal from the first specific frequency band to the second specific frequency band and the other is used for shifting the filtered pre-offset signal from the second specific frequency band to the base band. The filter 720 can be a low-pass filter, such as the filter 530 shown in FIG. 5, but is not limited to this only and can be filters of other types. In one embodiment, the frequency offset estimation module 730 can be implemented by a digital frequency and phase locked loop (DFPLL), but those skilled in the art should know that this is not a limitation of the present invention.

Figure 8:
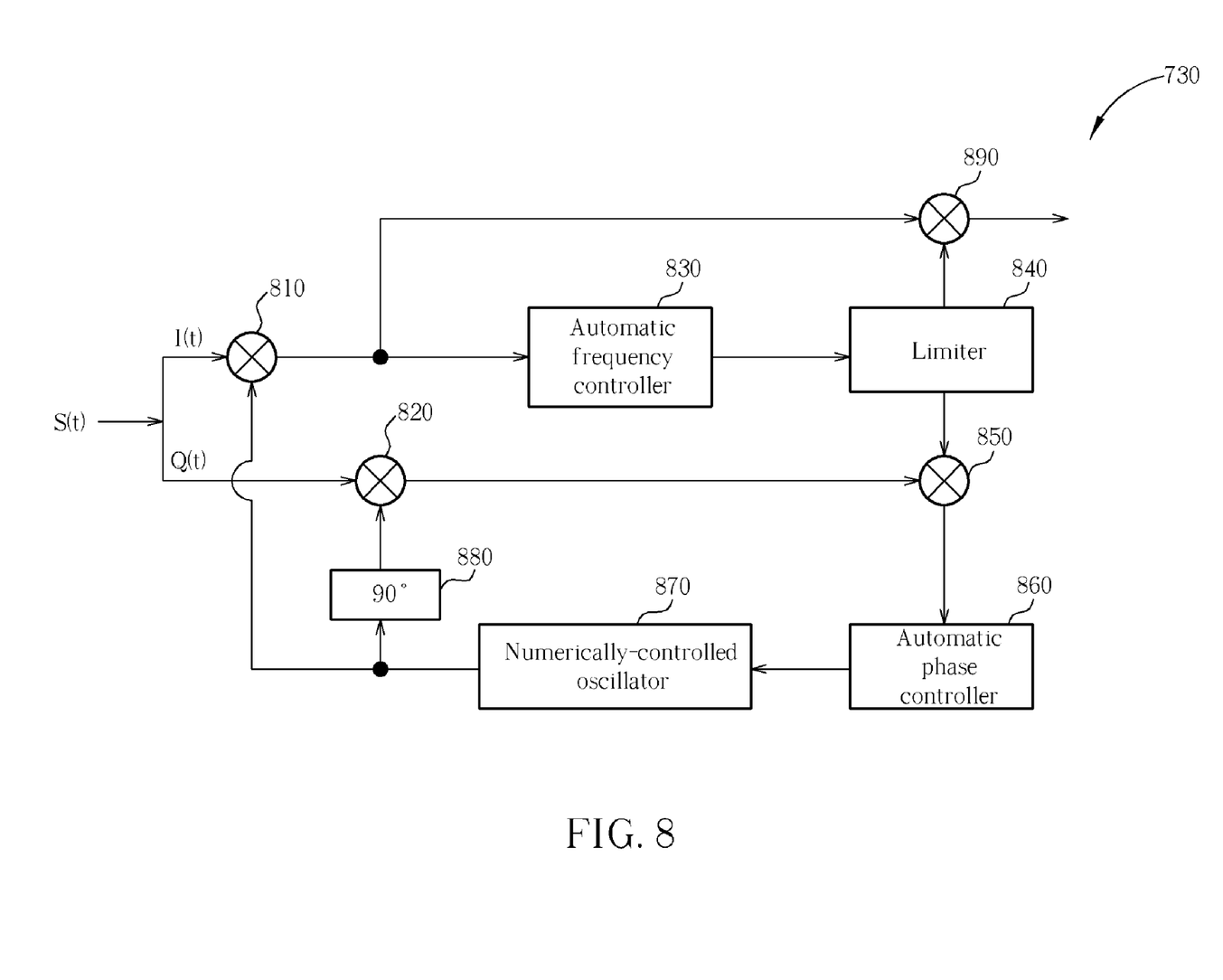
FIG. 8 is a diagram of an example of the frequency offset estimation module shown in FIG. 7.

Please refer to FIG. 8. FIG. 8 is a diagram of an example of the frequency offset estimation module 730 shown in FIG. 7. In this embodiment, the frequency offset estimation module 730 is implemented by a DFPLL architecture. The frequency offset estimation module 730 includes a first mixer 810, a second mixer 820, a third mixer 850, a fourth mixer 890, an automatic frequency controller (AFC) 830, a limiter 840, an automatic phase controller (APC) 860, a numerically-controlled oscillator (NCO) 870, and a phase shifter 880. The automatic frequency controller 830 is used for automatically maintaining a tuning of signals to a desired frequency. The limiter 840 is used for allowing the signal below a set value. The automatic phase controller 860 is used for automatically maintaining a tuning of signals to a desired phase. The numerically-controlled oscillator 870 is a digitally voltage-controlled oscillator, where the frequency of oscillation is varied by the applied DC voltage. The phase shifter 880 is used for shifting phase of signals, such as 90 degrees. A signal S(t) is divided into a real part I(t) and an imaginary part Q(t), and then the real part I(t) is maintained to a desired frequency by the automatic frequency controller 830 and the imaginary part Q(t) is maintained to a desired phase by the automatic phase controller 860. Finally, through the whole frequency offset estimation module 730, a frequency offset of the signal S(t) can be found.

The abovementioned embodiments are presented merely for describing features of the present invention, and in no way should be considered to be limitations of the scope of the present invention. The above-mentioned first target signal 510 and the second target signal 610 comply with an ASTC format, but this should not be a limitation of the present invention, they can also comply with a digital multimedia broadcast-terrestrial/handheld (DMB-T/H) format or other digital broadcasting formats. Please note that the pre-offset frequency fp is not limited to set to 300 KHz exactly, and can be adjusted depending on demands. Furthermore, the filter 530 shown in FIG. 5 and FIG. 6 should be the same as the filter 230 shown in FIG. 2 and FIG. 3. The filters 530 and 230 can be a low-pass filter (LPF) or band-pass filter (BPF) or a combination thereof, but is not limited to this only and can be filters of other types. In one embodiment, the frequency offset estimation module 730 can be implemented by a DFPLL, but those skilled in the art should know that this is not a limitation of the present invention.

In summary, the present invention provides a method and related frequency offset estimation circuit for estimating frequency offsets. Because the ATSC format signals have a signal characteristic that the intensity of signals at higher frequencies than the pilot signal is much greater than the intensity of signals at lower frequencies than the pilot signal, interference caused from signals at higher frequencies is much greater than interference caused from signals at lower frequencies. Through shifting the pilot signal of the target signal from the IF band to the pre-offset frequency fp (such as 300 KHz) before shifting it to the base band, the range of the negative frequency offset estimation ($-\Delta f$) can be extended. This is because the pre-offset frequency fp is a positive value and can make the pilot fall in a positive value or a very small negative value in the frequency axis (fp$-\Delta f$). Thereby, the filtered pre-offset signal won't be interfered by the signals having higher frequencies than the pilot seriously and wrong frequency offset estimation or synchronization failure won't happen, especially for the negative frequency offset estimation.

Those skilled in the art will readily observe that numerous modifications and alterations of the device and method may be made while retaining the teachings of the invention.

What is claimed is:

1. A method for estimating frequency offsets comprising:
shifting a target signal from a first specific frequency band to a second specific frequency band to generate a pre-offset signal according to a frequency shifting direction, wherein the target signal complies with a specific TV format, wherein the first specific frequency band and the second specific frequency band are different frequency bands, which are not base-bands;
performing a specific filtering operation upon the pre-offset signal to generate a filtered pre-offset signal;
shifting the filtered pre-offset signal from the second specific frequency band to the base band to generate a base-band (BB) signal according to the frequency shifting direction; and
performing a frequency offset estimation upon the base-band signal.

2. The method of claim 1, wherein the frequency shifting direction is a direction shifting signals from a higher frequency to a lower frequency in the frequency axis; a center frequency of the first specific frequency band is greater than that of the second specific frequency band; and the center frequency of the second specific frequency band is greater than that of the base band.

3. The method of claim 1, wherein the specific filtering operation is a low-pass filtering or a band-pass filtering.

4. The method of claim 1, wherein the specific filtering operation filters out signal components having frequencies greater than a cut-off frequency; the target signal includes a pilot signal complying with an advanced television system committee (ASTC) format; and a frequency of the pilot signal in the pre-offset signal is lower than the cut-off frequency.

5. The method of claim 4, wherein the frequency of the pilot signal in the pre-offset signal is substantially equal to 300KHz.

6. The method of claim 1, wherein the specific TV format is an advanced television system committee (ASTC) format.

7. The method of claim 1, wherein the specific TV format is a digital multimedia broadcast-terrestrial/handheld (DMB-T/H) format.

8. A method for estimating frequency offsets comprising:
shifting an intermediate frequency (IF) signal from an IF band to a specific frequency band to generate a pre-offset signal according to a frequency shifting direction, where the specific frequency band is not a base band;
performing a specific filtering operation upon the pre-offset signal to generate a filtered pre-offset signal;
shifting the filtered pre-offset signal from the specific frequency band to the base band to generate a base-band (BB) signal according to the frequency shifting direction; and
performing a frequency offset estimation upon the base-band signal.

9. The method of claim 8, wherein the frequency shifting direction is a direction shifting signals from a higher frequency to a lower frequency in the frequency axis; a center frequency of the IF band is greater than that of the specific frequency band; and the center frequency of the specific frequency band is greater than that of the base band.

10. The method of claim 8, wherein the specific filtering operation is a low-pass filtering or a band-pass filtering.

11. A frequency offset estimation circuit comprising:
a frequency shifter, for shifting a target signal from a first specific frequency band to a second specific frequency band to generate a pre-offset signal according to a frequency shifting direction and for shifting a filtered pre-offset signal from the second specific frequency band to a base band to generate a base-band (BB) signal according to the frequency shifting direction, wherein the target signal complies with a specific TV format, wherein the first specific frequency band and the second specific frequency band are different frequency bands, which are not the base-bands;
a filter, coupled to the frequency shifter, for performing a specific filtering operation upon the pre-offset signal to generate the filtered pre-offset signal; and a frequency offset estimation module, coupled to the frequency shifter, for performing a frequency offset estimation upon the base-band signal.

12. The frequency offset estimation circuit of claim 11, wherein the frequency shifting direction is a direction shifting signals from a higher frequency to a lower frequency in the frequency axis; a center frequency of the first specific frequency band is greater than that of the second specific frequency band; and the center frequency of the second specific frequency band is greater than that of the base band.

13. The frequency offset estimation circuit of claim 11, wherein the filter is a low-pass filter or a band-pass filter.

14. The frequency offset estimation circuit of claim 11, wherein the filter filters out signal components having frequencies greater than a cut-off frequency;

the target signal includes a pilot signal complying with an advanced television system committee (ASTC) format; and a frequency of the pilot signal in the pre-offset signal is lower than the cut-off frequency.

15. The frequency offset estimation circuit of claim 14, wherein the frequency of the pilot signal in the pre-offset signal is substantially equal to 300KHz.

16. The frequency offset estimation circuit of claim 11, wherein the frequency offset estimation module is a digital frequency and phase locked loop (DFPLL).

17. The frequency offset estimation circuit of claim 11, wherein the specific TV format is an advanced television system committee (ATSC) format.

18. The frequency offset estimation circuit of claim 11, wherein the specific TV format is a digital multimedia broadcast-terrestrial/handheld (DMB-T/H) format.

* * * * *